(12) United States Patent
Antunez

(10) Patent No.: US 6,244,292 B1
(45) Date of Patent: Jun. 12, 2001

(54) BALLCOCK VALVE FOR WATER TANKS

(76) Inventor: Bruce A. Antunez, 1143 Indian Springs, Glendora, CA (US) 91740

( * ) Notice: Subject to any disclaimer, the term of this patent is extended or adjusted under 35 U.S.C. 154(b) by 0 days.

(21) Appl. No.: 09/487,551

(22) Filed: Jan. 19, 2000

(51) Int. Cl.[7] .......................... F16K 31/34; F16K 31/385
(52) U.S. Cl. .................. 137/315.08; 137/218; 137/414; 137/436; 137/441
(58) Field of Search .................. 137/15.26, 218, 137/315.08, 409, 414, 436, 437, 441, 451; 251/45, 46, 118, 126, 127

(56) References Cited

U.S. PATENT DOCUMENTS

| | | | |
|---|---|---|---|
| 2,911,000 | * 11/1959 | Doyle | 137/414 |
| 2,971,525 | * 2/1961 | Antunez, Jr. | 137/444 |
| 3,074,684 | * 1/1963 | Doyle | 137/414 |
| 3,495,803 | * 2/1970 | Schoepe et al. | 137/414 |
| 3,669,138 | * 6/1972 | Schoepe et al. | 137/218 |
| 3,785,397 | * 1/1974 | Young | 137/434 |
| 3,895,645 | * 7/1975 | Johnson | 137/403 |
| 4,122,862 | * 10/1978 | Brandelli | 137/437 |
| 4,180,096 | * 12/1979 | Johnson | 137/403 |
| 4,416,302 | * 11/1983 | Schoepe | 137/315.08 |
| 4,494,562 | * 1/1985 | Stephens | 137/436 |
| 4,562,859 | * 1/1986 | Shames et al. | 137/414 |
| 4,718,449 | * 1/1988 | Ralph | 137/444 |
| 5,318,062 | * 6/1994 | Antunez | 137/414 |
| 5,904,176 | * 5/1999 | Li | 137/434 |

* cited by examiner

Primary Examiner—George L. Walton
(74) Attorney, Agent, or Firm—Donald D. Mon

(57) ABSTRACT

A ballcock valve with a cap having an opening, and in the opening an axial groove. A valve control has a neck that fits in the opening, and a tooth that fits in the groove, so that when a shoulder on the cap and on the valve control abut, the valve control can be rotated to hold it to the cap. When the cap is fixed to a base, a control diaphragm is properly positioned relative to the base and to a valve seat on the base.

6 Claims, 5 Drawing Sheets

FIG. 5
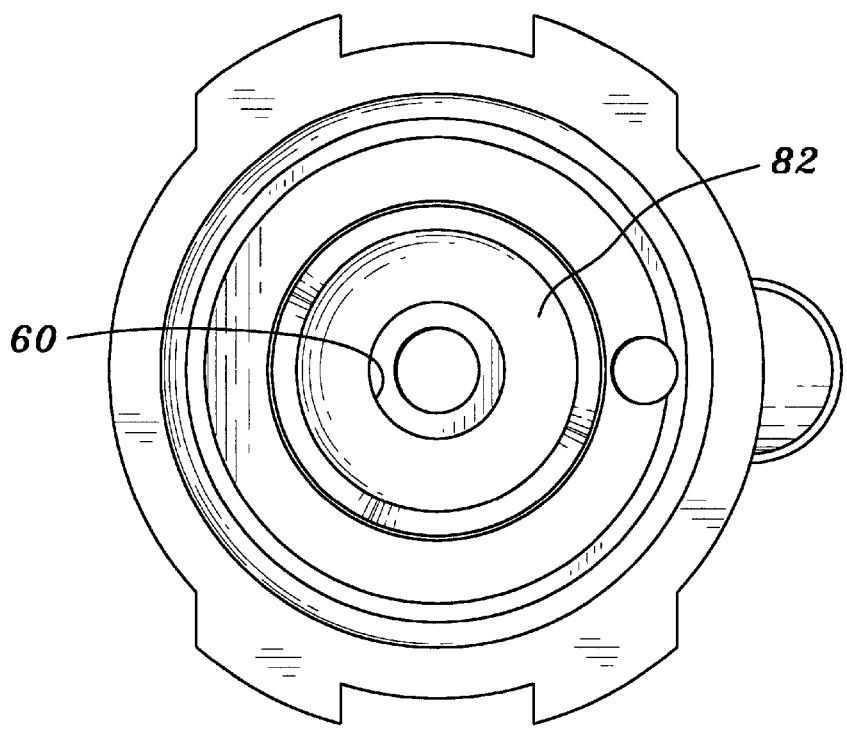
FIG. 6
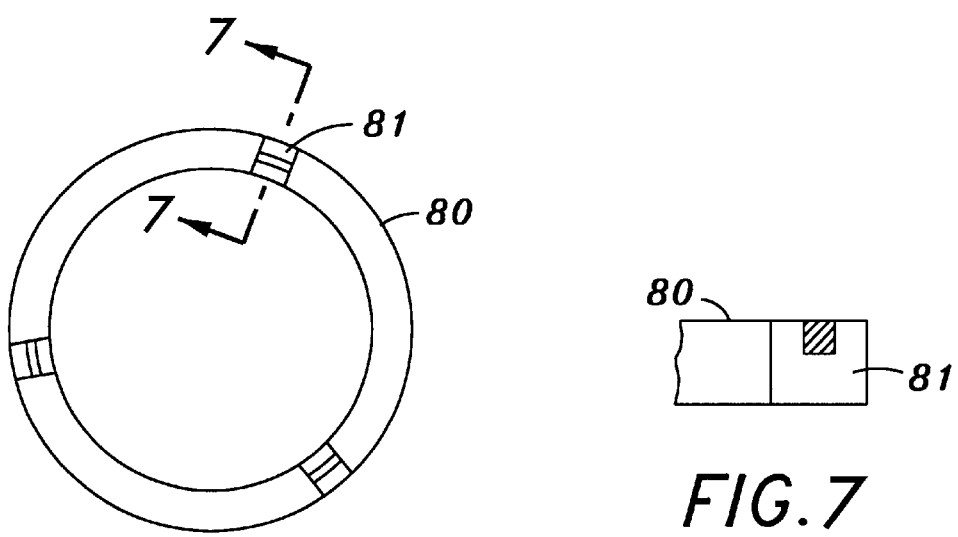
FIG. 7

BALLCOCK VALVE FOR WATER TANKS

FIELD OF THE INVENTION

A ballcock valve that responds to changes in the water level in a storage tank so as to restore and maintain a volume of water after the contents of the tank are released by a tank valve, an example being found in toilet tanks.

BACKGROUND OF THE INVENTION

Differential pressure actuated ballcock valves are well-known in water storage installations, especially in toilet tanks where a volume of water needed to flush a toilet or urinal is stored until it is released by opening a tank valve. The tank valve is opened by the user, usually by lifting it with a linkage of some kind. It floats for a while as the water level lowers, and then closes to permit the tank to refill.

The ballcock valve is responsive to the water level. It includes a float of some kind which causes the valve to close when the water level is suitably high, and opens when the level is lower so to provide water to refill the tank.

Early ballcock valves relied on the direct leverage force of the float, exerted through a lever arm, to hold the valve closed. The more modern valves do not require such "brute" force. Instead, the lever arm reacts with a differential pressure valve in which a pressure-responsive diaphragm acts to open or close the valve when a bias force on one side is exerted or vented The lever arm merely acts to open or close a vent port. A well-known example of such a valve is shown in applicant's U.S. Pat. No. 5,318,062, issued Jun. 7, 1994, which is incorporated herein its entirety. This invention is an improvement on this patented valve.

Ballcock valves have a long and successful history of reliability and longevity. Art is surprising that valves which are trusted to store and control very substantial volumes of water in very sensitive areas are so inexpensive. A valve which costs only a few dollars at retail will be installed in a toilet tank and forgotten about for years.

The potential for damages if one of these fails is surprisingly large. For example a leaking valve which permits overflow from the tank or the commode in an upper floor of a building can result in severe water damage to walls and contents in multiple floors below. Long-term reliability of this type of valve is a fundamental requirement.

In most fields of valves, reliability is purchased by extreme upgrading of the bulk and cost of materials and parts in the valve structure. An examination of fluid control valves in process controls and the like bear witness to this. In brief, valves used to control fluids in high risk areas are usually very expensive.

Cost in high risk applications is ordinarily acceptable, but in plumbing, and especially in housing and in the aftermarket for repair and replacement products directed to the housing market, there is not the luxury of comfortable extra cost for over-design. Instead, fractions of pennies in manufacturing cost become important, especially in mass markets of millions of valves, and more importantly in these days of low-cost labor of foreign competition. Molded plastic valves which would have tolerated manufacturing costs on the order of five dollars must now be made for less than one dollar and must be fully competitive, reliable, and long-lived.

The cost of any product, and especially of one which is made as an assembly of many parts, includes not only the parts themselves, but the cost of assembling them. To this must be added the cost of rejects and reworks when the basic design is insufficiently reliable to assure that the parts will be assembled not only quickly but correctly, and that when they are assembled the valve will work.

Accordingly, it is not the object of this invention to improve the function of the valve. Working valves for toilet tanks have been successfully supplied for many decades. Instead it is the object of this invention to provide valves for the same purpose with an elegantly simple construction that can be manufactured very economically, and which can quickly and reliably be assembled by well-paid labor, still producing a product which competes economically and functionally with the best-known products produced in low cost countries.

The major improvements in these valves were made long ago. Now there remains the objective of producing them at the very least cost. It is here that ballcock inventions will result in reduced prices, and the ability to produce lowest-cost products using relatively high cost labor. Both of these criteria are favored by the instant invention.

BRIEF DESCRIPTION OF THE INVENTION

This invention is accomplished in a ballcock having a body that encloses a flow chamber which receives water under pressure from a riser at a valve seat. A tank fill pipe (discharge pipe) and a bowl fill pipe lead from the flow chamber.

A control valve includes a diaphragm which includes a flexible portion that can bear against the valve seat to close the ballcock valve, or deflect away from it to permit flow of supply water to the flow chamber. The operative position of the diaphragm is determined by a control pin whose position is set by a float that is responsive to the water level in the tank.

According to this invention, the diaphragm is mounted in a control body that is mounted in the valve body and aligned with the diaphragm. This control body includes a control chamber that is selectively exposed to atmospheric or supply line pressure. Structurally it includes a neck which extends through a passage in a neck on the cap of the body.

According to a feature of this invention, the passage through the cap has an axial groove from end to end, and the neck on the control body includes a tooth which can engage and slide along the groove. When past the groove, the control body can be turned so the tooth will prevent removal of the control body from the cap. The control body is then reliably held to the cap by a simple insert and twist operation, and will properly hold when the cap is tightened.

Flow beyond the valve seat may optionally be through passages between vanes, or through passages in a ring.

The above and other features of this invention will be fully understood from the following detailed description and accompanying drawings, in which:

BRIEF DESCRIPTION OF THE DRAWINGS

FIG. 5 is a view similar to FIG. 4, modified for use with a modified portion of the ballcock valve;

FIG. 6 is a plan view of a washer to be used with the modification of FIG. 5;

FIG. 7 is a cross-section taken at line 7—7 in FIG. 6

DETAILED DESCRIPTION OF THE INVENTION

Figure 1:
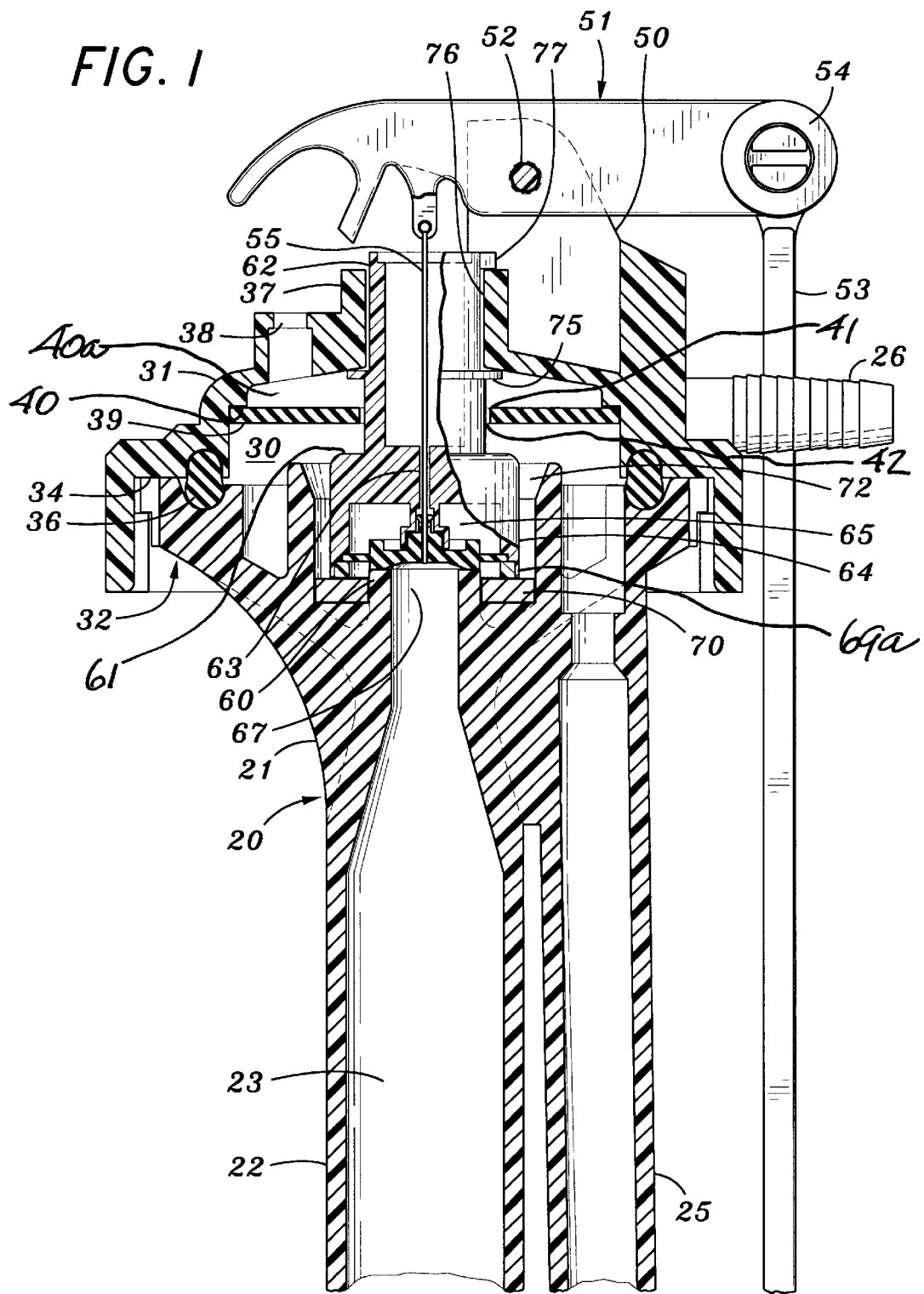
FIG. 1 is an axial cross-section of the presently preferred embodiment of the invention taken at line 1—1 in FIG. 4.
Figure 2:
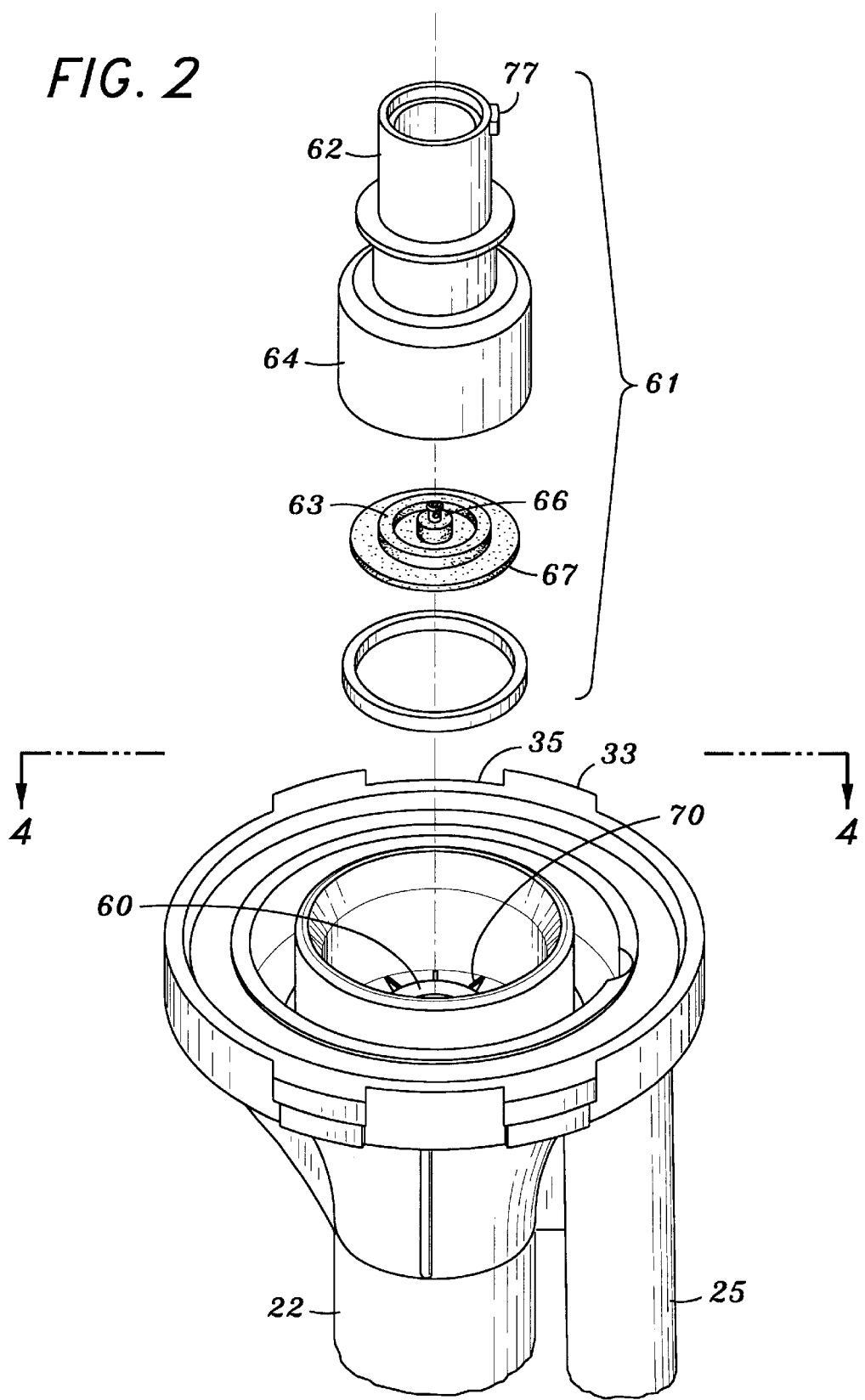
FIG. 2 is an exploded view of a portion of FIG. 1.
Figure 3:
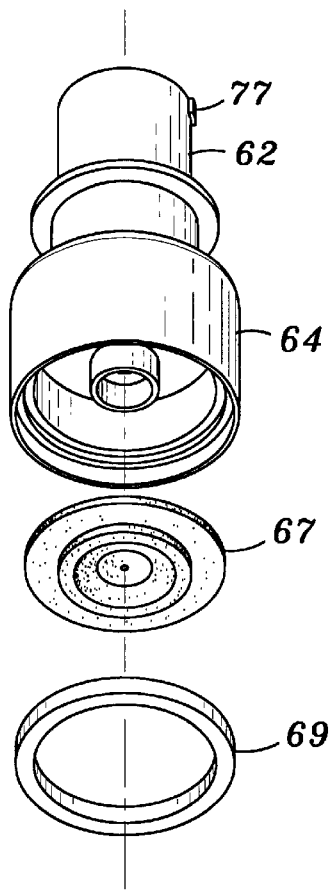
FIG. 3 is an exploded view of a portion of FIG. 2.

A ballcock valve 20 according to this invention is shown in FIG. 1. Its body 21 includes a riser 22 with an internal water supply passage 23. Only the upper portion of the body is shown. The riser extends downwardly to a conventional threaded mounting and seal means (not shown) to connect the valve structurally to the tank and enable the riser to be connected to a water supply pipe for supplying water under pressure to passage 23. These are conventional devices that are not part of the invention and do not require detailed description here.

The body also includes a tank refill pipe 25 which discharges into the tank to refill it, and a bowl refill pipe 26 which connects to a pipe or hose that discharges into the commode to fill it to the extent desired while awaiting the next cycle. Again, these are conventional provisions in all flush type toilet tanks and ballcock valves.

A flow chamber 30 is formed between body 21 and a cap 31. The cap is fixed to the body by a bayonet type engagement 32 comprising blades 33 and overhanging shoulders 34. Gaps 35 are provided to pass the blades. After passing the blades through the gap, the cap is rotated, releasably to engage the cap to the body. A flexible seal 36 seals between the cap and the body so as to be compressed when the cap is tightened on the body to make a seal.

The tank refill pipe (discharge pipe) and bowl refill pipe both receive water from the flow chamber.

The cap includes a neck 37 and an anti-siphon vent port 38. An anti-siphon valve disc 39 is placed in the flow chamber, extending across it, and normally resting against a shoulder 40 in the flow chamber.

Valve disc 39 has two functions. The region 40a above it is exposed to atmosphere through vent port 38. In the occasional event that an upstream pressure source is broken and exerts a siphon effect in supply passage 23, the disc will be drawn down to open flow chamber 30 to atmospheric air from the vent port. This will break the suction so that water downstream from the valve seat cannot be drawn into the supply passage. This protects the water supply from pollution.

Its other function is to close the flow chamber at the cap when water is flowing from the supply passage. In this event the edge 41 of an aperture 42 through valve disc 39 will bear against a collar 75 to be described, and against shoulder 40 in the cap. This will isolate the vent port from flow chamber 30 when pressure is on.

A hinge plate 50 rises from the cap. An actuator arm 51 is hinged to the plate by a pin 52. Arm 51 extends away from the body to a float arm 53. Arm 53 It is attached to arm 51 by an adjustment 54 which sets the angle between the arms. A float (not shown) is attached to the float arm. Adjustment 54 adjusts the level where the float will be when the ballcock valve is to be closed.

On the other side of arm 51 from the float arm, a control pin 55 is suspended to extend downwardly into the valve for control purposes. This pin is formed with an accurate outer diameter for a purpose to be described.

Inside the flow chamber, around the upper end of the water supply passage, a valve seat 60 is formed. It is a circular seat. Opening and closing of the valve at this seat is the ultimate object of the invention.

For this purpose, a valve control 61 is placed in the flow chamber. It includes a neck 62 which fits in an internal cylindrical wall in neck 37 in the cap. Neck 62 is cylindrical and tubular and is exposed to the atmosphere. A pin passage 63 passes through a base portion 64 of valve control 61.

A bias chamber 65 in the valve control is selectively opened to atmospheric pressure (although it is always filled with water) or to water supply pressure from the water supply passage. A port 66 in a flexible control diaphragm 67 provides controlled access to the bias chamber. The side of the diaphragm which faces valve seat 60 is movable toward and away from the valve seat, depending on what pressure exists at the time inside the bias chamber. If supply line pressure is "on" in the bias chamber, the larger area of the inside surface of the diaphragm provides a net force to close the valve. If the control chamber pressure is atmospheric, the supply line pressure will lift the diaphragm off of valve seat 60, and the valve will be open to flow.

The diaphragm is held at its outer edge to the control by a retainer 69 inserted in and preferably bonded to the control body. The retainer fits in a counter bore 69a in base portion 64.

It is the position of the control pin as determined by the float, which selects whether the bias chamber is vented to atmosphere, or is under supply pressure.

When the valve is opened, water flows over the valve seat and under the diaphragm. The lower end of the control body bears against ribs 70. The spaces 71 between ribs permit water to flow through them, upwardly through channel 72 and into the flow chamber. The ribs provide additional lower support for the control.

The valve control is an important feature of this invention. Attention is called to collar 75 around neck 62. This bears upwardly against the inside wall of the cap when the valve is assembled. An axial groove 76 extends for the full length of the wall in the neck. A tooth 77 is formed on the outer wall of the neck of the valve control, and projects outwardly from it. It is dimensioned to fit in and slide axially in the groove. When the collar bears against the cap, the tooth will have passed the upper edge of neck 37 of the body. Then the control will be rotated to move the tooth out of alignment with the groove. The control is now firmly held to the cap between the tooth and the collar. If the collar is not provided, then the riser will give support at the bottom of the valve control.

It will now be seen how this valve can be so expeditiously made and assembled. The diaphragm is readily placed in the control body in a first separate operation. Thereafter it is only necessary to pass neck 62 into neck 37, turn the control body, and place the control pin in position. The assembly is quick and complete. The cap bears against the seal, and also against the collar to press the control against the body, so as to form a solid assembly. The entire control can be already assembled, so there need be no clumsiness, or misplacing or elimination of parts.

The purpose of the tooth and groove arrangement is to hold the valve control to the cap, not necessarily permanently. When the control is turned so the tooth is not aligned with the groove, the control will not fall off the cap. Therefore some looseness is tolerable. However, it is helpful for the length of the groove and the distance from the tooth to the collar to be substantially equal so as to form a more manipulable combination.

Figure 4:
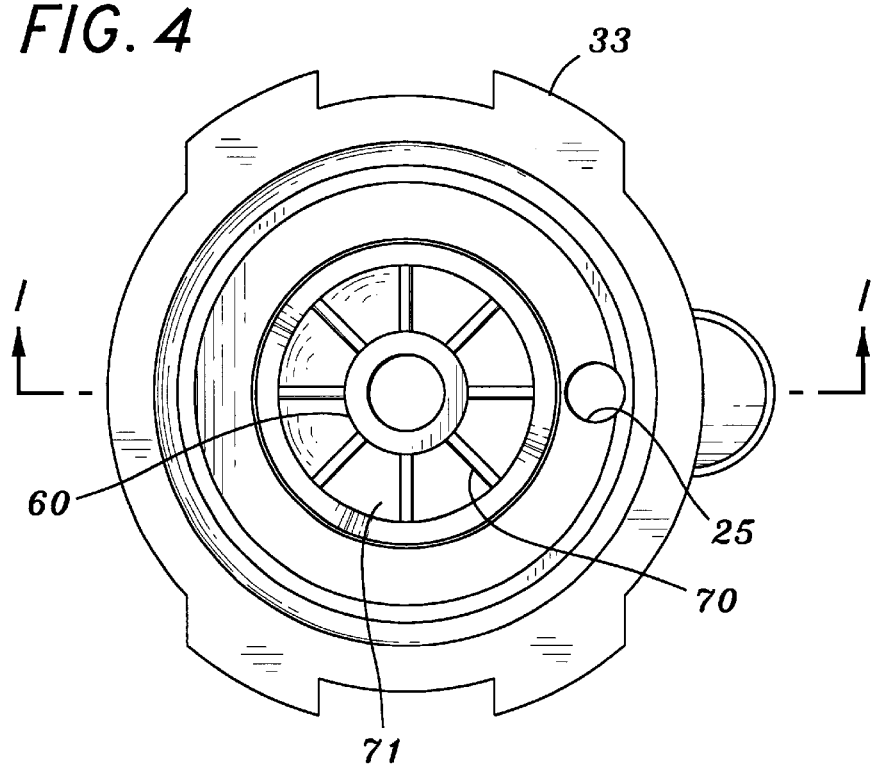
FIG. 4 is a partial view taken at line 4—4 in FIG. 2.

It is possible to simplify the body of the valve. In FIG. 4, ribs 70 are shown with intervening passages as a means to pass water from the valve seat into channel 72. Instead, these ribs may be omitted, and a ring 80 (see FIGS. 6 and 7) may be placed in that region instead. The ring is provided with notches 81 to provide flow passages. The ring may be seated in a modified region 82 (see FIG. 5) which was formerly occupied by the ribs. The body is simplified, and all advantages of the riser are still provided.

Figure 8:
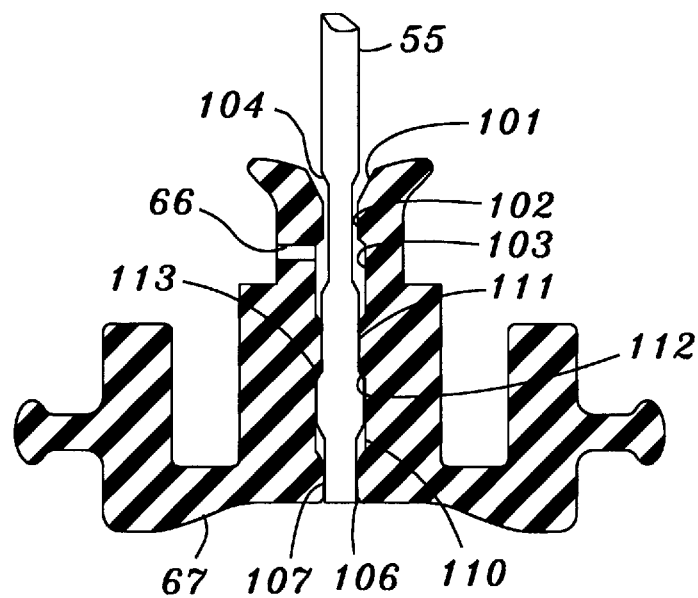
FIG. 8 is a fragmentary axial cross-section showing the control diaphragm in its "on" condition.
Figure 9:
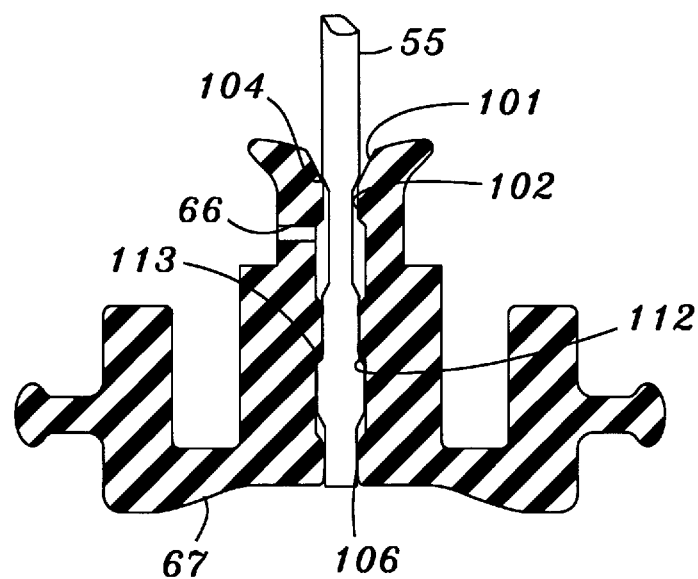
FIG. 9 is a view similar to FIG. 8 showing its "off" condition.

Although an understanding of the details of the interaction between control pin 55 and the diaphragm structure is not necessary for an understanding of the invention, FIG. 8 and 9 provide a detailed showing of the two operating conditions. FIG. 8 shows the "on" position, in which the control pin is moved upwardly because the float has moved down in the tank, and the control chamber is open to atmospheric pressure and isolated from supply pressure. the net force is upwardly, and the diaphragm moves up off the seat to permit water flow.

FIG. 9 shows the "off" condition, in which the float has raised with the water in the tank to a sufficient level. This moves control pin 55 down. Because of construction to be disclosed, this closes the control chamber to atmospheric pressure and opens it to system pressure. Then the net force is down on the diaphragm. It closes the valve.

This is accomplished at two valving sites. An upwardly-facing tapered valve seat 101 leads to a clearance 102 and bleed chamber 103 which intersects port 66. A plug enlargement 104 on the control pin moves toward and away from seat 101 to control transmission of pressure from atmospheric above seat 101 when removed from it, and to close the seat when moved downwardly against it.

At the bottom of the diaphragm, passage 106 always leaves a clearance 107 between the pin and the passage wall, so that system pressure is always "on" in an enlargement 110. The pin and diaphragm have a clearance 111 between them, just above a downwardly-facing tapered valve seat 112. An upwardly-facing plug 113 on the pin will close the passage when the pin is raised (because the float is down). This isolates the control chamber from supply pressure, and the valve is open to flow.

When the valve is off (FIG. 9) the situation is reversed. The open valve is closed, and port 66 is open to system pressure so the diaphragm is biased closed.

The resulting constructions are reliably and inexpensively produced and assembled. In either embodiment, the valve control is a simple construction readily assembled as a sub-part. Its installation procedure is no more than a well-directed thrust and turn. The use of the ring in FIGS. 5–7 is a simplification of the body of FIG. 1 which may or may not be useful to the manufacturer. Either embodiment is reliably and inexpensively assembled.

This invention is not to be limited by the embodiments shown in the drawings and described in the description, which are given by way of example and not of limitation, but only in accordance with the scope of the appended claims.

I claim:

1. In a ballcock valve of the type used to refill a tank with water to a desired level, said valve having a vertical riser extending along a vertical axis, a valve seat atop the riser, a water supply passage extending axially through the riser and opening into the valve seat through an inlet port, a base body, a separate cap removably attachable to said base body, a flow chamber for receiving water that passes from said valve seat, and a bowl refill tube discharging from said flow chamber, the improvements comprising:

said cap having a central cap opening therethrough, an inside wall facing into said discharge chamber, and a cylindrical wall, in said cap opening, said cylindrical wall having an axially extending groove therein;

a valve control comprising a rigid control body, a neck on said control body extending into said cap opening, a collar on said control body neck disposed and arranged to bear against said inside wall of the cap, a tooth on the outside of the neck adapted to fit slidingly in said groove to enable the control body neck to be inserted into the cylindrical wall of the cap, said tooth being spaced from said collar on the control body neck by substantially the length of the groove so as to be positioned beyond the groove when the collar abuts said inside wall so the valve control body can be rotated to position the tooth away from the groove, whereby to retain the valve control against separation from the cap;

said valve control further including a cavity to form a bias chamber, a flexible diaphragm extending across the body to close the bias chamber, said diaphragm positioned to abut the valve seat to prevent flow through the valve, and to move away from it to permit said flow, a control port through the diaphragm exposed to supply valve pressure and to the bias chamber, a control pin adapted selectively to close the control port and vent the bias chamber to atmosphere, or to open the control port to supply pressure and isolate the bias chamber from atmosphere; and a lever responsive to stored water level to establish the position of the control rod.

2. Apparatus according to claim 1 in which the diaphragm is fixed to said control body.

3. Apparatus according to claim 2 in which a retainer holds the diaphragm to the control body.

4. Apparatus according to claim 2 in which the diaphragm is fitted in a groove in said control body.

5. Apparatus according to claim 2 in which the control body, when the cap is attached to the valve body, bears against a group of rigid vanes with flow passages between them to pass water which flows over the valve seat, the vanes giving physical support to the control body, said vanes being integral with the valve body.

6. Apparatus according to claim 2 in which a ring is placed in said flow chamber below said control body and around said valve seat, said ring providing structural support for the control body, and having radial passages to pass water which flows over the valve seat.

* * * * *